United States Patent
Ogawa

(10) Patent No.: US 10,915,034 B2
(45) Date of Patent: Feb. 9, 2021

(54) CARRIER CORE MATERIAL AND ELECTROPHOTOGRAPHIC CARRIER USING SAME AND ELECTROPHOTOGRAPHIC DEVELOPER

(71) Applicants: DOWA ELECTRONICS MATERIALS CO., LTD., Tokyo (JP); DOWA IP CREATION CO., LTD., Okayama (JP)

(72) Inventor: Shou Ogawa, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 0 days.

(21) Appl. No.: 16/491,365

(22) PCT Filed: Mar. 15, 2018

(86) PCT No.: PCT/JP2018/010215
§ 371 (c)(1),
(2) Date: Sep. 5, 2019

(87) PCT Pub. No.: WO2018/180543
PCT Pub. Date: Oct. 4, 2018

(65) Prior Publication Data
US 2019/0391506 A1 Dec. 26, 2019

(30) Foreign Application Priority Data
Mar. 31, 2017 (JP) ................. 2017-069667

(51) Int. Cl.
*G03G 9/00* (2006.01)
*G03G 9/107* (2006.01)
*C01G 49/00* (2006.01)

(52) U.S. Cl.
CPC ....... *G03G 9/1075* (2013.01); *C01G 49/0036* (2013.01); *C01P 2006/10* (2013.01); *C01P 2006/42* (2013.01)

(58) Field of Classification Search
CPC ................................................... G03G 9/1075
(Continued)

(56) References Cited

U.S. PATENT DOCUMENTS

| 8,535,867 B2 | 9/2013 | Suwa et al. |
| 2011/0129772 A1 | 6/2011 | Iwata et al. |
| 2011/0183253 A1* | 7/2011 | Aga ............ G03G 9/1075 430/111.33 |

FOREIGN PATENT DOCUMENTS

| JP | 2011-090120 A | 5/2011 |
| JP | 2011-164224 A | 8/2011 |

(Continued)

OTHER PUBLICATIONS

Jun. 12, 2018 International Search Report issued in International Patent Application No. PCT/JP2018/010215.

*Primary Examiner* — Mark A Chapman
(74) *Attorney, Agent, or Firm* — Oliff PLC

(57) ABSTRACT

A carrier core material is represented by a composition formula $M_xFe_{3-x}O_4$ (where M is at least one type of metal element selected from Mg, Mn, Ca, Ti, Cu, Zn and Ni, $0<X<1$), in which part of M and/or Fe is substituted with Sr and formed of ferrite particles, and in the carrier core material, a Sr content is equal to or more than 2500 ppm but equal to or less than 12000 ppm, the amount of Sr eluted with pure water at a temperature of 25° C. is equal to or less than 50 ppm, an apparent density is equal to or more than 1.85 g/cm³ but equal to or less than 2.25 g/cm³ and magnetization $\sigma_{1k}$ when a magnetic field of $79.58\times10^3$ A/m (Continued)

(1000 oersteds) is applied is equal to or more than 63 $Am^2/kg$ but equal to or less than 75 $Am^2/kg$.

5 Claims, 2 Drawing Sheets

(58) Field of Classification Search
USPC .................................................. 430/111.34
See application file for complete search history.

(56) References Cited

FOREIGN PATENT DOCUMENTS

| | | |
|---|---|---|
| JP | 2011-180296 A | 9/2011 |
| JP | 2012-181398 A | 9/2012 |
| JP | 2015-200872 A | 11/2015 |

\* cited by examiner

US 10,915,034 B2

CARRIER CORE MATERIAL AND ELECTROPHOTOGRAPHIC CARRIER USING SAME AND ELECTROPHOTOGRAPHIC DEVELOPER

TECHNICAL FIELD

The present invention relates to a carrier core material and an electrophotographic carrier using such a carrier core material and an electrophotographic developer.

BACKGROUND ART

For example, in an image forming apparatus using an electrophotographic system, such as a facsimile, a printer or a copying machine, an electrostatic latent image formed on the surface of an electrostatic latent image carrying member (hereinafter also referred to as the "photosensitive member") is visualized as an image with a developer, and the visualized image is transferred to a sheet or the like and is thereafter fixed by being heated and pressurized. In terms of achieving high image quality and colorization, as a developer, a so-called two-component developer containing a carrier and a toner is widely used.

Development using the two-component developer described above is performed as follows. In a region (hereinafter also referred to as the "development region") in which a developer carrying member (hereinafter also referred to as the "development roller") that incorporates a plurality of magnetic poles and that carries the developer on its surface and a photosensitive member are arranged opposite each other with a predetermined distance therebetween substantially parallel to each other and in which the photosensitive member and the development roller are opposite each other, a magnetic brush where carriers are aggregated so as to stand like ears is formed on the development roller, and a development bias voltage is applied between the photosensitive member and the development roller so as to adhere the toner to an electrostatic latent image on the surface of the photosensitive member.

As the carrier described above, a carrier which has high magnetization and high chargeability is desired, and a carrier core material in which a predetermined amount of Sr is mixed and which is formed of ferrite particles and the like have so far been proposed (for example, patent document 1).

However, when $SrCO_3$ is used which has so far been generally used as a Sr component raw material, Cl (chlorine) and Sr (strontium) which are included as impurities in a Fe component raw material or the like react with each other so as to generate $SrCl_2$. Even when a calcination temperature exceeds 1000° C., $SrCl_2$ is hardly evaporated so as to be left in the ferrite particles. Since Cl is easily bound to water, when Cl is present on the surface of the ferrite particles, water in air is adsorbed, with the result that the chargeability of the carrier core material is lowered.

Hence, patent document 2 proposes a technology in which a Cl concentration measured by the elution method of a carrier core material is made to fall within a low concentration range, and in which thus the chargeability is increased and an environmental variation is decreased.

RELATED ART DOCUMENT

Patent Document

Patent Document 1: Japanese Unexamined Patent Application Publication No. 2011-164224

Patent Document 2: Japanese Unexamined Patent Application Publication No. 2011-180296

DISCLOSURE OF THE INVENTION

Problems to be Solved by the Invention

In the proposed technology described above, in order to reduce the concentration of Cl eluted, it is necessary to use a raw material having a low Cl content, that is, a high purity raw material or to provide auxiliary facilities for smoothly discharging chlorine gas from a calcination furnace in a calcination step.

An object of the present invention is to provide a carrier core material that has high magnetization and high chargeability without use of a high purity raw material, that is excellent in the environmental stability of a charged amount and that is formed of ferrite particles in which the surface has a concave/convex shape such that an apparent density is low.

Means for Solving the Problem

In order to achieve the above object, according to the present invention, there is provided a carrier core material which is represented by a composition formula $M_XFe_{3-X}O_4$ (where M is at least one type of metal element selected from a group consisting of Mg, Mn, Ca, Ti, Cu, Zn and Ni, 0<X<1), in which part of M and/or Fe is substituted with Sr and which is formed of ferrite particles, and in the carrier core material, a Sr content is equal to or more than 2500 ppm but equal to or less than 12000 ppm, the amount of Sr eluted with pure water at a temperature of 25° C. (hereinafter simply referred to as the "amount of Sr eluted") is equal to or less than 50 ppm, an apparent density is equal to or more than 1.85 g/cm$^3$ but equal to or less than 2.25 g/cm$^3$ and magnetization $\sigma_{1k}$ when a magnetic field of $79.58 \times 10^3$ A/m (1000 oersteds) is applied is equal to or more than 63 Am$^2$/kg but equal to or less than 75 Am$^2$/kg.

Methods of measuring the Sr content, the amount of Sr eluted, the apparent density and the magnetization $\sigma_{1k}$ will be described in examples which will be discussed later. In the present specification, unless otherwise specified, "to" is used to mean that values mentioned before and after the "to" are included as the lower limit value and the upper limit value.

In the configuration described above, the carrier core material preferably contains a compound represented by $SrFe_{12}O_{19}$.

Moreover, according to the present invention, there is provided an electrophotographic development carrier in which the surface of the carrier core material described above is coated with a resin.

Furthermore, according to the present invention, there is provided an electrophotographic developer which includes the electrophotographic development carrier described above and a toner.

Advantages of the Invention

The carrier core material of the present invention has high magnetization and high chargeability, and is excellent in the environmental stability of a charged amount, and furthermore, the surface has a concave/convex shape such that an apparent density is low. In this way, even when a development device whose image formation speed is high is used, excellent image quality can be obtained for a long period of time.

DESCRIPTION OF EMBODIMENTS

One of the main features of a carrier core material according to the present invention is that the carrier core material is represented by a composition formula $M_xFe_{3-x}O_4$ (where M is at least one type of metal element selected from a group consisting of Mg, Mn, Ca, Ti, Cu, Zn and Ni, $0<X<1$), that part of M and/or Fe is substituted with Sr and that a Sr content is equal to or more than 2500 ppm but equal to or less than 12000 ppm.

When Sr is contained, in a calcination step, a Sr ferrite of a magnetoplumbite type crystal structure is generated. Then, the Sr ferrite inhibits the growth of crystals of a spinel ferrite which is adjacent to the Sr ferrite and which has a spinel type crystal structure in the direction of the Sr ferrite. In this way, the growth of crystals of the spinel ferrite in the other directions is facilitated, and consequently, the formation of recesses and projections in ferrite particles is facilitated.

When the Sr content is equal to or more than 2500 ppm but equal to or less than 12000 ppm, the formation of recesses and projections in the ferrite particles is smoothly facilitated. On the other hand, when the Sr content is less than 2500 ppm, the formation of recesses and projections in the ferrite particles is not sufficiently facilitated, and thus the charging performance may be degraded. When the Sr content exceeds 12000 ppm, the crystals of the spinel ferrite may be abnormally grown. Moreover, magnetization is lowered, and thus carrier scattering occurs.

Figure 1:
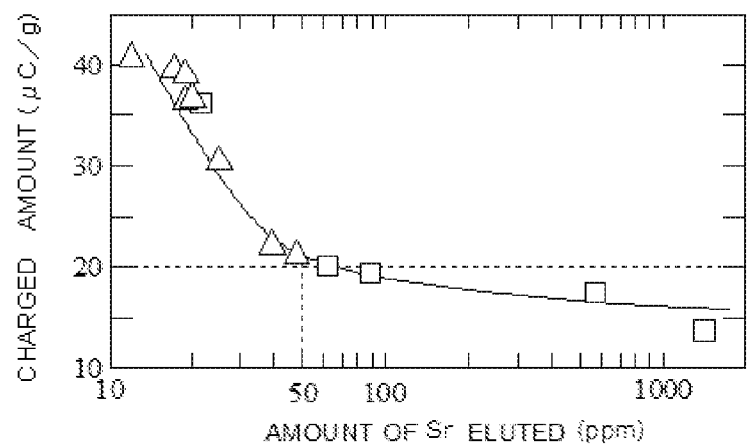
FIG. 1 A graph showing a relationship between the charged amount of a carrier core material and the amount of Sr eluted.

Another of the main features of the carrier core material according to the present invention is that the amount of Sr eluted is equal to or less than 50 ppm. FIG. 1 shows a relationship between the charged amount of the carrier core material and the amount of Sr eluted. In FIG. 1, the vertical axis represents the charged amount of the carrier core material, and the horizontal axis represents the amount of Sr eluted, and the relationship between the charged amount of the carrier core material and the amount of Sr eluted is shown. Data of FIG. 1 is measurement values in examples and comparative examples which will be described later, A represents the measurement values in the examples and □ represents the measurement values in the comparative examples.

As is clear from FIG. 1, when the amount of Sr eluted is equal to or less than 100 ppm, as the amount of Sr eluted is increased, the charged amount of the carrier core material is rapidly lowered whereas when the amount of Sr eluted exceeds 100 ppm, as the amount of Sr eluted is increased, the charged amount of the carrier core material is gradually lowered to the minimum value. The absolute value of the charged amount which is required in the carrier core material is generally equal to or more than 20 μC/g. Hence, in the present invention, the amount of Sr eluted is determined to be equal to or less than 50 ppm. More preferably, the amount of Sr eluted is equal to or less than 25 ppm.

The above-described fact that as the amount of Sr eluted is increased, the charged amount of the carrier core material is lowered is estimated to result from the following mechanism. As a Sr component raw material, in general, $SrCO_3$ has so far been used. In a case where $SrCO_3$ is used as the Sr component raw material, when the temperature in the calcination step is increased, $SrCl_2$ is generated as indicated by reaction formula (1) below.

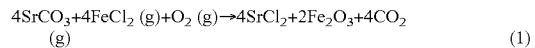

$$4SrCO_3 + 4FeCl_2\ (g) + O_2\ (g) \rightarrow 4SrCl_2 + 2Fe_2O_3 + 4CO_2\ (g) \qquad (1)$$

A Cl component may be contained as an inevitable impurity in a Fe component raw material or the like. In order to facilitate the formation of recesses and projections in the surface of the ferrite particles, a Cl component raw material such as HCl may be added. This is because when the Cl component is present, as is understood from reaction formula (2) below, $FeCl_2$ (g) is generated so as to react with $O_2$ in the surface of the particles, thus $Fe_3O_4$ is precipitated and consequently, the formation of recesses and projections in the surface of the particles is facilitated.

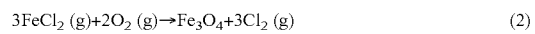

$$3FeCl_2\ (g) + 2O_2\ (g) \rightarrow Fe_3O_4 + 3Cl_2\ (g) \qquad (2)$$

Figure 2:
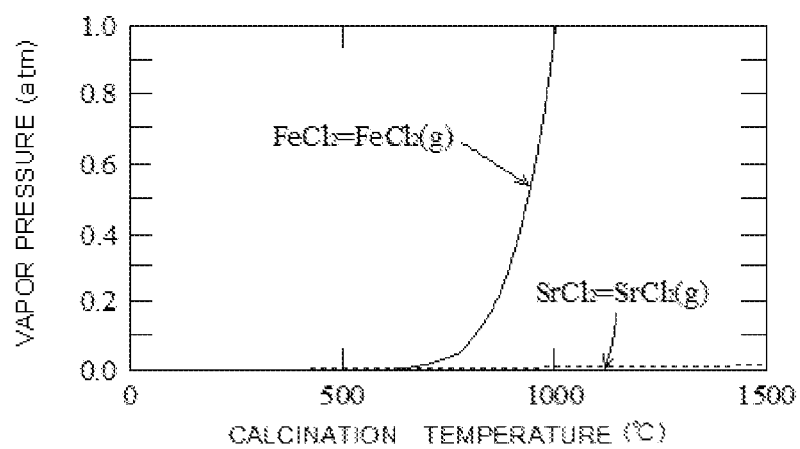
FIG. 2 A graph showing a relationship between the vapor pressure and the calcination temperature of $FeCl_2$ and $SrCl_2$.

FIG. 2 is a graph showing a relationship between the vapor pressure and the calcination temperature of $FeCl_2$ and $SrCl_2$. In FIG. 2, the vertical axis represents the vapor pressure, and the horizontal axis represents the calcination temperature, and variations in the vapor pressure of $FeCl_2$ and $SrCl_2$ with the calcination temperature are shown. As is understood from FIG. 2, when the calcination temperature exceeds about 750° C., the vapor pressure of $FeCl_2$ is rapidly increased. In other words, when the temperature exceeds 750° C., almost all $FeCl_2$ is evaporated. By contrast, even when the calcination temperature is increased, the vapor pressure of $SrCl_2$ is hardly increased. In other words, even when the temperature is increased, $SrCl_2$ is not evaporated so as to be left.

As described above, even when the temperature is increased, $SrCl_2$ generated in the ferrite particles is hardly evaporated so as to be left on the surface of the ferrite particles. $SrCl_2$ easily adsorbs water. Hence, the charged amount of the carrier core material is lowered by $SrCl_2$ present on the surface of the ferrite particles.

Although Sr is generally formed into the Sr ferrite so as to facilitate the formation of recesses and projections in the surface of the ferrite particles, since Sr is formed as $SrCl_2$, the formation of recesses and projections in the surface of the ferrite particles is not sufficiently facilitated. Moreover, although in general, in the calcination step, as indicated in reaction formula (2) described above, $FeCl_2$ is gasified to react with oxygen on the surface of the particles such that magnetite ($Fe_3O_4$) is precipitated and thus the formation of recesses and projections in the surface of the particles is facilitated, since Cl is formed as $SrCl_2$, the formation of recesses and projections in the surface of the ferrite particle is not sufficiently facilitated.

Hence, in the present invention, as the Sr component raw material, $SrFe_{12}O_{19}$ powder is used. Since $SrFe_{12}O_{19}$ is a chemically stable compound, even when the temperature is increased in the calcination temperature, the generation of $SrCl_2$ caused by binding to Cl is reduced. In this way, a decrease in the charged amount of the carrier core material is reduced. Moreover, $SrFe_{12}O_{19}$ serves as a wall so as to inhibit the growth of crystals of the spinel ferrite in the direction of $SrFe_{12}O_{19}$, and thus the growth of crystals of the spinel ferrite in the other directions is facilitated, with the result that the formation of recesses and projections in the surface of the particles is facilitated.

(Production Method of $SrFe_{12}O_{19}$)

The Fe component raw material and the Sr component raw material are weighed and put into a dispersion medium so as to form a slurry. As the Sr component raw material, for example, $SrCO_3$ is used. As the dispersion medium used in the present invention, water is suitable. In addition to the Fe component raw material and the Sr component raw material, as necessary, a dispersant or the like may be mixed with the dispersion medium. As the dispersant, for example, polycarboxylic acid ammonium or the like can be suitably used. The amount of dispersant mixed is preferably set such that the concentration in the slurry is about 0.5 to 2 mass %. The solid content concentration of the slurry preferably falls within a range of 50 to 90 mass %. This mixture is pulverized with a wet ball mill (medium diameter of 2 mm), and thus the mixed slurry is obtained.

Then, the pulverized slurry is sprayed and dried so as to be granulated. Then, the granulated material is put into a furnace which is heated to a predetermined temperature so as to be calcined by a general method for synthesizing ferrite particles, and thus the particles of $SrFe_{12}O_{19}$ are obtained.

The apparent density of the carrier core material of the present invention is equal to or more than 1.85 g/cm³ but equal to or less than 2.25 g/cm³. In the carrier core material of the present invention, as compared with a conventional carrier core material, the apparent density is low. In other words, a large number of gaps between the particles are provided. The toner is captured into these gaps between the particles and is transported to a development region by the rotation of a development roller.

In the carrier core material of the present invention, magnetization $\sigma_{1k}$ when a magnetic field of $79.58 \times 10^3$ A/m (1000 oersteds) is applied is equal to or more than 63 Am²/kg but equal to or less than 75 Am²/kg. The magnetization $\sigma_{1k}$ of the carrier core material is set to fall within this range, and thus, for example, the coercivity of a magnetic brush on the development roller is sufficiently acquired, with the result that a phenomenon in which the carriers are adhered to a photosensitive member is reduced.

The volume average particle diameter of the carrier core material of the present invention preferably falls within a range equal to or more than 25 μm but less than 50 μm, and more preferably falls within a range equal to or more than 30 μm but equal to or less than 40 μm. The volume average particle diameter of the carrier core material is equal to or more than 25 μm, and thus a magnetic force necessary for the individual particles is reliably provided, with the result that for example, the adherence of the carriers to the photosensitive member is reduced. On the other hand, the volume average particle diameter is less than 50 μm, and thus image characteristics can be kept satisfactory. In order to make the volume average particle diameter of the carrier core material fall within the range described above, the carrier core material is preferably classified with a sieve or the like during the manufacturing process or after the manufacturing process of the carrier core material. The distribution of particle diameters is preferably sharp.

The ferrite particles of the carrier core material of the present invention are represented by a composition formula $M_xFe_{3-x}O_4$ (where M is at least one type of metal element selected from a group consisting of Mg, Mn, Ca, Ti, Cu, Zn and Ni, $0<X<1$), and part of M and/or Fe is substituted with Sr. M is preferably Mn. M is preferably Mn because when M is Mn, a balance between a magnetic force and resistance is satisfactory. More preferably, for the amount of Mn substituted, $0.5<X<1$ holds true.

Although a method of manufacturing the ferrite particles of the carrier core material of the present invention is not particularly limited, a manufacturing method which will be described below is suitable.

The Fe component raw material, an M component raw material and the $SrFe_{12}O_{19}$ powder are weighed, are put into the dispersion medium and are mixed so as to form a slurry. Here, M is at least one type of metal element selected from a group consisting of Mg, Mn, Ca, Ti, Cu, Zn and Ni. As the Fe component raw material, $Fe_2O_3$ powder a Fe oxide, a Fe hydroxide or the like can be used, and as the M component raw material, when M is Mn, $MnCO_3$, $Mn_3O_4$ or the like can be used whereas when M is Mg, MgO, $Mg(OH)_2$ or $MgCO_3$ can be suitably used. As a Ca component raw material, at least one type of compound selected from CaO, $Ca(OH)_2$, $CaCO_3$ and the like is suitably used. The solid content concentration of the slurry preferably falls within a range of 50 to 90 wt %. The amount of $SrFe_{12}O_{19}$ powder added preferably falls within a range of 4 to 22 wt %.

Here, in order to control the apparent density and the like of the ferrite particles, it is preferable to add a small amount of Cl component. A small amount of Cl component is added, and thus an iron chloride gasified in the calcination step reacts with oxygen on the surface of the particles such that magnetite ($Fe_3O_4$) is precipitated, with the result that the formation of recesses and projections in the surface of the particles is facilitated. The Cl component may be contained as an inevitable impurity in the Fe component raw material or the like. As the Cl component raw material, HCl can be used.

Then, the raw materials are put into the dispersion medium so as to form a slurry. As the dispersion medium used in the present invention, water is suitable. In addition to the precalcination raw materials described above, as necessary, a binder, a dispersant or the like may be mixed with the dispersion medium. As the binder, for example, polyvinyl alcohol can be suitably used. The amount of binder mixed is preferably set such that the concentration in the slurry is about 0.5 to 2 mass %. As the dispersant, for example, polycarboxylic acid ammonium or the like can be suitably used. The amount of dispersant mixed is preferably set such that the concentration in the slurry is about 0.5 to 2 mass %. In addition, a lubricant, a sintering accelerator or the like may be mixed. The solid content concentration of the slurry preferably falls within a range of 50 to 90 mass %. The solid content concentration of the slurry more preferably falls within a range of 60 to 80 mass %. When the solid content concentration of the slurry is equal to or more than 50 mass %, a small number of pores within the particles are produced in the granulated material, and thus it is possible to prevent insufficient sintering at the time of the calcination.

The weighed raw materials may be mixed, precalcined and disintegrated and thereafter put into the dispersion medium so as to form a slurry. The temperature of the precalcination preferably falls within a range of 750 to 900° C. It is preferable that the temperature be equal to or more than 750° C. because the formation of part thereof into a ferrite caused by the precalcination proceeds, only a small amount of gas is generated at the time of calcination and thus a reaction between the solids sufficiently proceeds. On the other hand, it is preferable that the temperature be equal to or less than 900° C. because the degree of sintering caused by the precalcination is low and thus it is possible to sufficiently pulverize the raw materials in the subsequent slurry pulverization step. As an atmosphere at the time of the precalcination, the atmosphere is preferable.

Then, the slurry produced as described above is wet-pulverized. For example, a ball mill or a vibration mill is used to perform wet-pulverization for a predetermined time. The average particle diameter of the pulverized raw materials is preferably equal to or less than 5 μm and is more preferably equal to or less than 1 μm. Within the vibration mill or the ball mill, a medium having a predetermined particle diameter is preferably provided. Examples of the material of the medium include an iron-based chromium steel and oxide-based zirconia, titania and alumina. As the form of the pulverization step, either of a continuous type and a batch type may be used. The particle diameter of the pulverized material is adjusted such as by a pulverization time, a rotation speed and the material and the particle diameter of the medium used.

Then, the pulverized slurry is sprayed and dried so as to be granulated. Specifically, the slurry is introduced into a spray drying machine such as a spray dryer, is sprayed into the atmosphere and is thereby granulated into a spherical shape. The temperature of the atmosphere at the time of the spray drying preferably falls within a range of 100 to 300° C. In this way, it is possible to obtain a spherical granulated material having a particle diameter of 10 to 200 μm. Then, the obtained granulated material is classified with a vibration sieve, and thus the granulated material having a predetermined particle diameter range is produced.

Then, the granulated material described above is put into a furnace heated to a predetermined temperature, and is calcined by a general method for synthesizing ferrite particles so as to generate the ferrite particles. The calcination temperature preferably falls within a range of 1100 to 1300° C. When the calcination temperature is less than 1100° C., it is unlikely that phase transformation occurs and that sintering proceeds. When the calcination temperature exceeds 1300° C., excessive grains may be generated by excessive sintering. A holding time is preferably equal to or more than 3 hours, and is more preferably equal to or more than 6 hours. The rate of temperature increase up to the calcination temperature preferably falls within a range of 250 to 500° C./h. An oxygen concentration in the calcination step is preferably controlled to fall within a range of 0.05 to 5%.

The calcined material obtained as described above is disintegrated. Specifically, for example, a hammer mill or the like is used to disintegrate the calcined material. As the form of the disintegration step, either of a continuous type and a batch type may be used.

Then, as necessary, classification may be performed after the disintegration processing such that the particle diameters are made to fall within a predetermined range. As a classification method, a conventional known method such as air classification or sieve classification can be used. After primary classification is performed with an air classifier, with a vibration sieve or an ultrasonic sieve, the particle diameters may be made to fall within the predetermined range. Furthermore, after the classification step, non-magnetic particles may be removed with a magnetic beneficiation machine. The particle diameter of the ferrite particle is preferably equal to or more than 25 μm but less than 50 μm.

Thereafter, as necessary, the ferrite particles after the classification are heated in an oxidizing atmosphere, and thus an oxide film is formed on the surface of the particles, with the result that the resistance of the ferrite particles may be increased (resistance increasing processing). As the oxidizing atmosphere, either of the atmosphere and the mixed atmosphere of oxygen and nitrogen may be used. The heating temperature preferably falls within a range of 200 to 800° C., and more preferably falls within a range of 250 to 600° C. The heating time preferably falls within a range of 0.5 to 5 hours.

The ferrite particles produced as described above are used as the carrier core material of the present invention. Then, in order for the desired chargeability and the like to be obtained, the outer circumference of the carrier core material is coated with a resin, and is used as an electrophotographic development carrier.

As the resin with which the surface of the carrier core material is coated, a conventional known resin can be used. Examples thereof include polyethylene, polypropylene, polyvinyl chloride, poly-4-methylpentene-1, polyvinylidene chloride, ABS (acrylonitrile-butadiene-styrene) resin, polystyrene, (meth) acrylic-based resin, polyvinyl alcohol-based resin, thermoplastic elastomers such as polyvinyl chloride-based, polyurethane-based, polyester-based, polyamide-based and polybutadiene-based thermoplastic elastomers and fluorine silicone-based resins.

In order to coat the surface of the carrier core material with the resin, a solution of the resin or a dispersion solution is preferably applied to the carrier core material. As a solvent for the coating solution, one or two or more types of the followings can be used: aromatic hydrocarbon-based solvents such as toluene and xylene; ketone-based solvents such as acetone, methyl ethyl ketone, methyl isobutyl ketone and cyclohexanone; cyclic ether-based solvents such as tetrahydrofuran and dioxane; alcohol-based solvents such as ethanol, propanol and butanol; cellosolve-based solvents such as ethyl cellosolve and butyl cellosolve; ester-based solvents such as ethyl acetate and butyl acetate; and amide-based solvents such as dimethyl formamide and dimethylacetamide. The concentration of the resin component in the coating solution generally falls within a range of 0.001 to 30 mass %, and particularly preferably falls within a range of 0.001 to 2 mass %.

As a method of coating the carrier core material with the resin, for example, a spray dry method, a fluidized bed method, a spray dry method using a fluidized bed and a dipping method can be used. Among them, the fluidized bed method is particularly preferable because it is possible to efficiently perform coating even with a small amount of resin. For example, in the case of the fluidized bed method, the amount of resin applied can be adjusted by the amount of resin solution sprayed and a spraying time.

With respect to the particle diameter of the carrier, its volume average particle diameter generally falls within a range which is equal to or more than 25 μm but less than 50 μm, and particularly preferably falls within a range which is equal to or more than 30 μm but equal to or less than 40 μm.

The electrophotographic developer according to the present invention is formed by mixing the carrier produced as described above and the toner. The mixing ratio between the carrier and the toner is not particularly limited, and is preferably determined, as necessary, from development conditions of the development device used or the like. In general, the concentration of the toner in the developer preferably falls within a range of 1 to 15 mass %. This is because when the concentration of the toner is less than 1 mass %, an image density is excessively lowered whereas when the concentration of the toner exceeds 15 mass %, the toner is scattered within the development device, and thus a stain within an apparatus may be produced or a failure may occur in which the toner is adhered to a background part of transfer paper or the like. The concentration of the toner more preferably falls within a range of 3 to 10 mass %.

As the toner, a toner can be used which is manufactured by a conventional known method such as a polymerization method, a pulverization/classification method, a melting granulation method or a spray granulation method. Specifically, a toner can be preferably used in which a coloring agent, a mold release agent, a charge control agent and the like are contained in a binder resin whose main component is a thermoplastic resin.

With respect to the particle diameter of the toner, in general, its volume average particle diameter by a coulter counter preferably falls within a range of 5 μm to 15 μm, and more preferably falls within a range of 7 μm to 12 μm.

A modifier may be added to the surface of the toner as necessary. Examples of the modifier include silica, alumina, zinc oxide, titanium oxide, magnesium oxide and polymethyl methacrylate. One or two or more types thereof can be combined and used.

The mixing of the carrier and the toner can be performed with a conventional known mixing device. For example, a Henschel mixer, a V-type mixer, a tumbler mixer and a hybridizer can be used.

Figure 3:
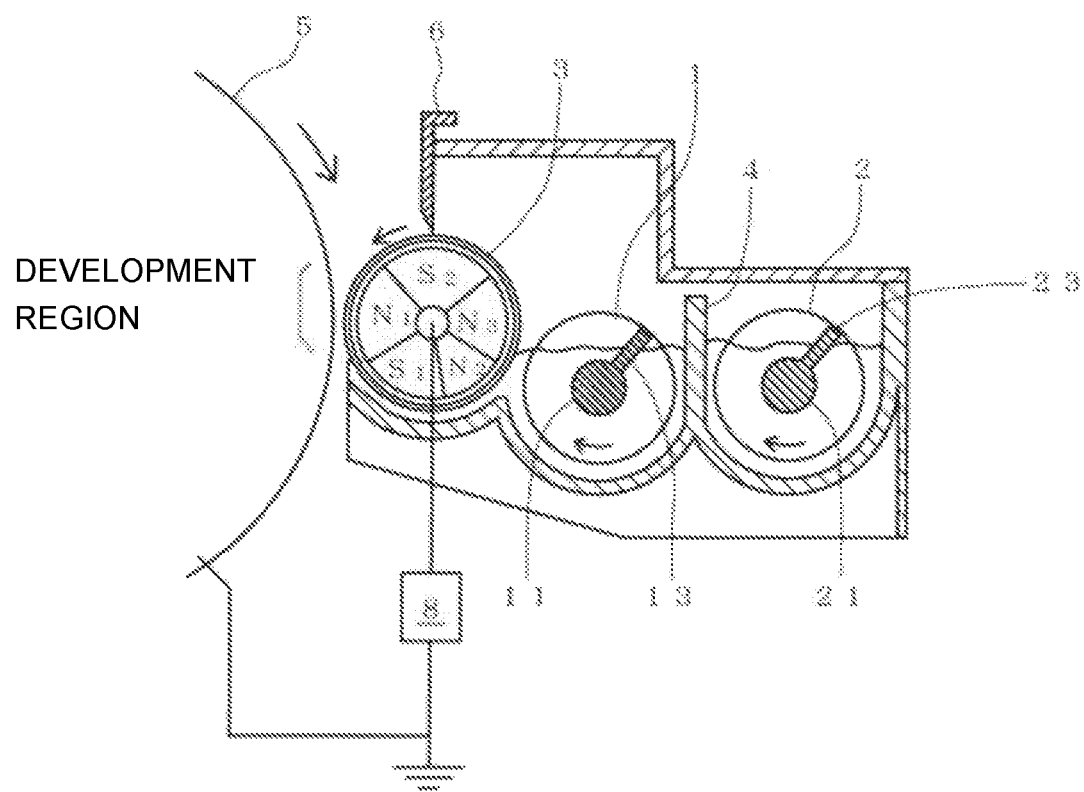
FIG. 3 A schematic diagram showing an example of a development device which uses carriers in the present invention.

Although a development method using the developer of the present invention is not particularly limited, a magnetic brush development method is preferably used. FIG. 3 shows a schematic diagram showing an example of a development device which performs magnetic brush development. The development device shown in FIG. 3 includes: a development roller 3 which incorporates a plurality of magnetic poles and which is freely rotatable; a regulation blade 6 which regulates the amount of developer on the development roller 3 transported to a development portion; two screws 1 and 2 which are arranged parallel to a horizontal direction and which respectively agitate and transport the developer in opposite directions; and a partition plate 4 which is formed between the two screws 1 and 2, which makes it possible to move the developer from one screw to the other screw at both end portions of the screws and which prevents the movement of the developer in the portions other than both the end portions.

In the two screws 1 and 2, spiral blades 13 and 23 are formed at the same inclination angles on shaft portions 11 and 21 and are rotated by an unillustrated drive mechanism in the same direction so as to respectively transport the developer in the opposite directions. At both the end portions of the screws 1 and 2, the developer is moved from one screw to the other screw. In this way, the developer formed of the toner and the carrier is constantly circulated and agitated within the device.

On the other hand, the development roller 3 includes a fixed magnet where within a metallic cylindrical member having recesses and projections of a few micrometers in its surface, as a magnetic pole generating means, five magnetic poles of a development magnetic pole N1, a transport magnetic pole S1, a separation magnetic pole N2, a pumping magnetic pole N3 and a blade magnetic pole S2 are sequentially arranged. When the development roller 3 is rotated in a direction indicated by an arrow, the developer is pumped up by the magnetic force of the pumping magnetic pole N3 from the screw 1 to the development roller 3. The developer carried on the surface of the development roller 3 is regulated in layer by the regulation blade 6 and is thereafter transported to the development region.

In the development region, a bias voltage obtained by superimposing an alternating-current voltage on a direct-current voltage is applied from a transfer voltage power supply 8 to the development roller 3. The direct-current voltage component of the bias voltage is set to a potential between the potential of a background portion and the potential of an image portion on the surface of a photosensitive drum 5. The potential of the background portion and the potential of the image portion are set to potentials between the maximum value and the minimum value of the bias voltage. The peak-to-peak voltage of the bias voltage preferably falls within a range of 0.5 to 5 kV, and the frequency preferably falls within a range of 1 to 10 kHz. The waveform of the bias voltage may be any waveform such as a rectangular wave, a sine wave or a triangular wave. In this way, the toner and the carrier are vibrated in the development region, the toner is adhered to an electrostatic latent image on the photosensitive drum 5 and thus the development is performed.

Thereafter, the developer on the development roller 3 is transported by the transport magnetic pole S1 into the device, is separated by the separation magnetic pole N2 from the development roller 3, is circulated and transported again by the screws 1 and 2 within the device and is agitated and mixed with the developer which is not subjected to the development. Then, the developer is newly supplied by the pumping magnetic pole N3 from the screw 1 to the development roller 3.

Although in the embodiment shown in FIG. 3, the number of magnetic poles incorporated in the development roller 3 is five, the number of magnetic poles may naturally be increased to 8, 10 or 12 so that the amount of movement of the developer in the development region is further increased or that the pumping property or the like is further enhanced.

For the composition and the like described above, a general chemical analysis method and a general device are preferably used. For example, for the individual metallic species, a quantitative analysis using ICP is preferably performed. For the analysis of Cl, a Cl content in the carrier core material was analyzed by a silver nitrate titration method. Specifically, pure water was added to a sample, and they were left and were thereafter filtered and washed. A phenolphthalein solution was used as an indicator, and when the solution was acidic, $NaHCO_3$ was added so as to turn the solution red. The solution after the elution of Cl was titrated with an $AgNO_3$ solution, and thus a Cl concentration in the carrier core material was determined. The amount of Sr eluted was analyzed by the following method. 100 g of pure water having a temperature of 25° C. was put into a stoppered glass bottle, 10 g of the carrier core material was added and they were shaken with a shaker for 60 minutes so as to be mixed. Here, as the shaker, a shaker "NEW-YS type" made by Yayoi Co., Ltd. was used so as to perform the shaking at a rate of 200 times/minute at an angle of 60°. An indoor environment was an environment in the atmosphere under atmospheric pressure at a room temperature of 25° C. After the mixture was left, filtration was performed. The filtered liquid was subjected to a quantitative analysis using ICP. The amount of Sr eluted in the carrier core material is a value obtained by conversion of the value obtained by the quantitative analysis using ICP to mass % with respect to the carrier core material.

The diameter of the particles is measured with a laser diffraction type particle size distribution measuring device ("Microtrac Model 9320-X100" made by Nikkiso Co., Ltd.) based on volume. An apparent density, for example, the apparent density of the carrier core material is measured according to JIS Z 2504. A fluidity, for example, the fluidity of the carrier core material is measured according to JIS Z 2502. For magnetic characteristics, for example, a room-temperature dedicated vibration sample type magnetometer (VSM) ("VSM-P7" made by Toei Industry Co., Ltd.) was used to apply an external magnetic field in a range of 0 to 79.58×10$^4$ A/m (10000 oersteds) continuously in one cycle, and thus magnetization $\sigma_{1k}$, saturated magnetization $\sigma_s$, residual magnetization $\sigma_r$ and a coercivity $H_c$ in a magnetic field of 79.58×10$^3$ A/m (1000 oersteds) were measured.

EXAMPLES

Although the present invention will be more specifically described below using examples, the present invention is not limited at all to these examples.

Example 1

As raw materials, 9.38 kg of $Fe_2O_3$ (average particle diameter of 0.6 μm), 3.90 kg of $Mn_3O_4$ (average particle diameter of 2.0 μm) and 1.27 kg of $SrFe_{12}O_{19}$ powder were dispersed in 4.97 kg of water, and as a dispersant, 90 g of an ammonium polycarboxylate-based dispersant was added, with the result that a mixture was formed. When the solid content concentration here was measured, it was 75 mass %. The mixture was subjected to pulverization processing using a wet ball mill (medium diameter of 2 mm), and thus the mixed slurry having a pH of 9.3 was obtained. The mixed slurry was sprayed with a spray drier into hot air of about 130° C., and thus a dried granulated material having a particle diameter of 10 to 200 μm was obtained. Coarse particles were separated from the granulated material with a sieve having a mesh of 54 μm, and minute particles were removed with a sieve having a mesh of 25 μm.

The granulated material was put into an electric furnace in the atmosphere of nitrogen in which the oxygen concentration was adjusted to be 3000 ppm, and was calcined at 150° C. for 3 hours. The obtained sintered powder was disintegrated and was thereafter classified with a vibration sieve, and thus a carrier core material having an average particle diameter of 34.3 μm was obtained. The composition formula of the carrier core material was $Mn_{0.83}Sr_{0.02}Fe_{2.15}O_4$.

The Sr content, the amount of Sr eluted, the powder characteristics, the magnetic characteristics, the charged amount, the image density and the carrier scattering of the obtained carrier core material were measured by measurement methods which will be described later. The results of the measurements are shown in table 1.

Example 2

A carrier core material having an average particle diameter of 34.3 μm was obtained by the same method as in example 1 except that 3.7 g of hydrochloric acid (36 wt %) and 3.7 g of ammonia water (25 wt %) serving as a pH adjusting agent were added such that the pH of the slurry was set to 9.4. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 3

A carrier core material having an average particle diameter of 34.1 μm was obtained by the same method as in example 1 except that 5.5 g of hydrochloric acid (36 wt %) and 5.5 g of ammonia water (25 wt %) serving as a pH adjusting agent were added such that the pH of the slurry was set to 9.5. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 4

A carrier core material having an average particle diameter of 34.3 μm was obtained by the same method as in example 1 except that 15.0 g of hydrochloric acid (36 wt %) and 15.0 g of ammonia water (25 wt %) serving as a pH adjusting agent were added such that the pH of the slurry was set to 9.4. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 5

A carrier core material having an average particle diameter of 34.5 μm was obtained by the same method as in example 1 except that 21.0 g of hydrochloric acid (36 wt %) and 21.0 g of ammonia water (25 wt %) serving as a pH adjusting agent were added such that the pH of the slurry was set to 9.6. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 6

A carrier core material having an average particle diameter of 34.1 μm was obtained by the same method as in example 1 except that 26.8 g of hydrochloric acid (36 wt %) and 26.8 g of ammonia water (25 wt %) serving as a pH adjusting agent were added such that the pH of the slurry was set to 9.4. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 7

A carrier core material having an average particle diameter of 34.1 μm was obtained by the same method as in example 1 except that 32.1 g of hydrochloric acid (36 wt %) and 32.1 g of ammonia water (25 wt %) serving as a pH adjusting agent were added such that the pH of the slurry was set to 9.6. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 8

A carrier core material having an average particle diameter of 34.1 μm was obtained by the same method as in example 3 except that as raw materials, 8.40 kg of $Fe_2O_3$ (average particle diameter of 0.6 μm), 3.33 kg of $Mn_3O_4$ (average particle diameter of 2.0 μm) and 3.26 kg of $SrFe_{12}O_{19}$ powder were used. The composition formula of the carrier core material was $Mn_{0.69}Sr_{0.05}Fe_{2.26}O_4$. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Example 9

A carrier core material having an average particle diameter of 34.3 μm was obtained by the same method as in example 4 except that as raw materials, 10.27 kg of $Fe_2O_3$ (average particle diameter of 0.6 μm), 4.07 kg of $Mn_3O_4$ (average particle diameter of 2.0 μm) and 0.66 kg of $SrFe_{12}O_{19}$ powder were used. The composition formula of the carrier core material was $Mn_{0.84}Sr_{0.01}Fe_{2.15}O_4$. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 1

A carrier core material having an average particle diameter of 34.6 μm was obtained by the same method as in example 1 except that as raw materials, 10.66 kg of $Fe_2O_3$ (average particle diameter of 0.6 μm), 4.16 kg of $Mn_3O_4$ (average particle diameter of 2.0 μm) and 178.3 g of $SrCO_3$ powder were dispersed in 4.97 kg of water, that as a dispersant, 90 g of an ammonium polycarboxylate-based dispersant was added, that 15.0 g of hydrochloric acid and 15.0 g of ammonia water serving as a pH adjusting agent were added and that thus a mixture was obtained. The composition formula of the carrier core material was $Mn_{0.86}Sr_{0.02}Fe_{2.12}O_4$. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 2

A carrier core material having an average particle diameter of 34.3 μm was obtained by the same method as in comparative example 1 except that 20.8 g of hydrochloric acid (36 wt %) and 20.8 g of ammonia water (25 wt %) serving as a pH adjusting agent were added such that the pH of the slurry was set to 9.5. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 3

A carrier core material having an average particle diameter of 34.4 μm was obtained by the same method as in comparative example 1 except that 26.5 g of hydrochloric acid (36 wt %) and 26.5 g of ammonia water (25 wt %) serving as a pH adjusting agent were added such that the pH of the slurry was set to 9.4.

Comparative Example 4

A carrier core material having an average particle diameter of 34.6 μm was obtained by the same method as in comparative example 1 except that 38.0 g of hydrochloric acid (36 wt %) and 38.0 g of ammonia water (25 wt %) serving as a pH adjusting agent were added such that the pH of the slurry was set to 9.5. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 5

A carrier core material having an average particle diameter of 34.6 μm was obtained by the same method as in example 3 except that as raw materials, 10.33 kg of $Fe_2O_3$ (average particle diameter of 0.6 μm), 4.09 kg of $Mn_3O_4$ (average particle diameter of 2.0 μm) and 0.58 kg of $SrFe_{12}O_{19}$ powder were used. The composition formula of the carrier core material was $Mn_{0.85}Sr_{0.01}Fe_{2.14}O_4$. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 6

A carrier core material having an average particle diameter of 34.6 μm was obtained by the same method as in example 8 except that 32.1 g of hydrochloric acid (36 wt %) and 32.1 g of ammonia water (25 wt %) serving as a pH adjusting agent were added such that the pH of the slurry was set to 9.5. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

Comparative Example 7

A carrier core material having an average particle diameter of 34.5 μm was obtained by the same method as in example 3 except that as raw materials, 8.14 kg of $Fe_2O_3$ (average particle diameter of 0.6 μm), 3.23 kg of $Mn_3O_4$ (average particle diameter of 2.0 μm) and 3.63 kg of $SrFe_{12}O_{19}$ powder were used. The composition formula of the carrier core material was $Mn_{0.67}Sr_{0.06}Fe_{2.27}O_4$. The Sr content, the amount of Sr eluted, the powder characteristics, the magnetic characteristics, the charged amount, the image density and the carrier scattering of the obtained carrier core material were measured by the measurement methods which will be described later. The results of the measurements are shown in table 1.

(Composition Analysis)
(Analysis of Sr)
A Sr content in the carrier core material was analyzed by the following method. The carrier core material was dissolved in an acid solution, and a quantitative analysis using ICP was performed. The Sr content in the carrier core material is the amount of Sr which was obtained by performing the quantitative analysis using ICP.

(Analysis of Cl)

A Cl content in the carrier core material was analyzed by the silver nitrate titration method. Specifically, pure water was added to a sample, and they were left and were thereafter filtered and washed. A phenolphthalein solution was used as an indicator, and when the solution was acidic, $NaHCO_3$ was added so as to turn the solution red. The solution after the elution of Cl was titrated with an $AgNO_3$ solution, and thus a Cl concentration in the carrier core material was determined.

(Analysis of Amount of Sr Eluted)

The amount of Sr eluted was analyzed by the following method. 100 g of pure water having a temperature of 25° C. was put into a stoppered glass bottle, 10 g of the carrier core material was added and they were shaken with a shaker for 60 minutes so as to be mixed. Here, as the shaker, the shaker "NEW-YS type" made by Yayoi Co., Ltd. was used so as to perform the shaking at a rate of 200 times/minute at an angle of 60°. After the mixture was left, filtration was performed. An indoor environment was an environment in the atmosphere under atmospheric pressure at a room temperature of 25° C. The filtered liquid was subjected to a quantitative analysis using ICP. The amount of Sr eluted in the carrier core material is a value obtained by conversion of the value obtained by the quantitative analysis using ICP to mass % with respect to the carrier core material.

(Method of Measuring Average Particle Diameter)

The average particle diameter and the cumulative particle diameter of the carrier core material were measured with the laser diffraction type particle size distribution measuring device ("Microtrac Model 9320-X100" made by Nikkiso Co., Ltd.). The measurement was based on volume.

(Apparent Density)

The apparent density of the carrier core material was measured according to JIS Z 2504.

(Fluidity)

The fluidity of the carrier core material was measured according to JIS Z 2502.

(Magnetic Characteristics)

The room-temperature dedicated vibration sample type magnetometer (VSM) ("VSM-P7" made by Toei Industry Co., Ltd.) was used to apply an external magnetic field in a range of 0 to $79.58 \times 10^4$ A/m (10000 oersteds) continuously in one cycle, and thus magnetization $\sigma_{1k}$, saturated magnetization $\sigma_s$, residual magnetization $\sigma_r$ and a coercivity $H_c$ in a magnetic field of $79.58 \times 10^3$ A/m (1000 oersteds) were measured.

(Charged Amount)

9.5 g of the carrier core material and 0.5 g of a toner for a commercial full color machine were put into a 100 ml stoppered glass bottle and were left for 12 hours in an environment in which the temperature was 25° C. and the relative humidity was 50%, and thus the humidity was adjusted. The carrier core material and the toner whose humidity was adjusted were shaken with a shaker for 30 minutes so as to be mixed. Here, as the shaker, the shaker "NEW-YS type" made by Yayoi Co., Ltd. was used so as to perform the shaking at a rate of 200 times/minute at an angle of 60°. 500 mg of the carrier core material and the toner which were mixed was weighed, and the charged amount thereof was measured with a charged amount measuring device. As the charged amount measuring device, "STC-1-C1 type" made by Nippon Pio-tech Co., Ltd. was used, a suction pressure was 5.0 kPa and a suction mesh was used which was made of SUS and which was 795 mesh. The measurement was performed twice on the same sample, and the average value thereof was assumed to be the charged amount. The charged amount is calculated by the following formula.

$$\text{charged amount}(\mu C/g) = \text{actual measured charge}(nC) \times 10^3 \times \text{coefficient}(1.0083 \times 10^{-3})/\text{toner mass}$$

(where toner mass=(mass before suction (g)−mass after suction (g)))

(Image Density)

A carrier was produced by coating the surface of the obtained carrier core material with a resin. Specifically, 450 weight parts of silicone resin and 9 weight parts of (2-aminoethyl) aminopropyl trimethoxysilane were dissolved in 450 weight parts of toluene serving as a solvent, and thus a coat solution was produced. The coat solution was applied with a fluidized bed-type coating device to 50000 weight parts of the carrier core material and was heated with an electric furnace whose temperature was 300° C., and thus the carrier was obtained. Then, in all the examples and the comparative examples, the carrier was likewise obtained.

The obtained carrier and a toner whose average particle diameter was about 5.0 were mixed with a pot mill for a predetermined time, and thus a two-component electrophotographic developer was obtained. In this case, the carrier and the toner were adjusted such that weight of the toner/(weight of the toner and the carrier)=5/100. Then, in all the examples and the comparative examples, the developer was likewise obtained.

The obtained developer was put into the development device of a structure shown in FIG. 3 (the peripheral speed of a development sleeve Vs: 406 mm/sec, the peripheral speed of a photosensitive drum Vp: 205 mm/sec and a photosensitive drum-to-development sleeve distance: 0.3 mm), a black solid image was formed, an image density was measured with a reflection densitometer (model number TC-6D made by Tokyo Denshoku Co., Ltd.) and evaluation was performed with the following criteria.

"◎": 1.50 or more

"○": 1.35 to 1.49

"Δ": 1.20 to 1.34

"x": 1.20 or less (Evaluation of Carrier Scattering)

200000 white sheets of A4-size were printed, then the number of black spots on the 200000th sheet was visually measured and evaluation was performed with the following criteria.

"○": 0 to 5 black spots

"Δ": 6 to 10 black spots

"x": 11 or more black spots

TABLE 1

| | Sr Component raw material | Powder characteristics | | | | | Magnetic characteristics | | | | Charged amount μC/g | Image density | Carrier scattering |
|---|---|---|---|---|---|---|---|---|---|---|---|---|---|
| | | Amount | | | | Average | | | | | | | |
| | | Sr content ppm | of Sr eluted ppm | Apparent density g/cm³ | Fluidity sec/50g | particle diameter μm | $\sigma_s$ Am²/kg | $\sigma_{1k}$ Am²/kg | σr Am²/kg | Hc 10³/ 4πA/m | | | |
| Example 1 | SrFe₁₂O₁₉ | 5000 | 8 | 2.24 | 36.6 | 34.3 | 83.6 | 71.0 | 0.6 | 5.4 | 40.2 | ◎ | ○ |
| Example 2 | SrFe₁₂O₁₉ | 5000 | 12 | 2.23 | 38.4 | 34.3 | 83.4 | 70.4 | 0.6 | 5.2 | 41.1 | ◎ | ○ |
| Example 3 | SrFe₁₂O₁₉ | 5100 | 17 | 2.23 | 40.1 | 34.1 | 82.5 | 69.2 | 0.7 | 5.8 | 40.1 | ◎ | ○ |
| Example 4 | SrFe₁₂O₁₉ | 4900 | 20 | 2.07 | 34.3 | 34.3 | 82.8 | 69.4 | 0.7 | 5.9 | 37.2 | ◎ | ◎ |
| Example 5 | SrFe₁₂O₁₉ | 5000 | 25 | 2.13 | 34.6 | 34.5 | 82.8 | 69.4 | 0.7 | 5.9 | 30.9 | ◎ | ◎ |
| Example 6 | SrFe₁₂O₁₉ | 5200 | 39 | 2.09 | 42.2 | 34.1 | 85.7 | 73.7 | 0.4 | 2.9 | 22.5 | ○ | ◎ |
| Example 7 | SrFe₁₂O₁₉ | 5000 | 48 | 2.07 | 42.4 | 34.1 | 85.4 | 71.7 | 0.5 | 4.2 | 21.5 | ○ | ◎ |
| Example 8 | SrFe₁₂O₁₉ | 11000 | 19 | 1.89 | 45.5 | 34.1 | 79.0 | 63.9 | 1.1 | 8.4 | 39.5 | ◎ | ○ |
| Example 9 | SrFe₁₂O₁₉ | 2800 | 19 | 2.23 | 38.4 | 34.3 | 83.1 | 70.1 | 0.6 | 5.9 | 36.9 | ◎ | ○ |
| Comparative example 1 | SrCO₃ | 5000 | 62 | 2.08 | — | 34.6 | 80.0 | 67.6 | 1.0 | 8.0 | 20.0 | △ | ◎ |
| Comparative example 2 | SrCO₃ | 5100 | 89 | 2.07 | — | 34.3 | 82.2 | 69.3 | 0.7 | 5.5 | 19.2 | △ | ◎ |
| Comparative example 3 | SrCO₃ | 4900 | 571 | 2.05 | — | 34.4 | 74.3 | 63.4 | 0.6 | 5.1 | 17.5 | X | ○ |
| Comparative example 4 | SrCO₃ | 5000 | 1433 | 2.05 | — | 34.6 | 82.8 | 68.9 | 0.5 | 5.7 | 13.6 | X | ◎ |
| Comparative example 5 | SrFe₁₂O₁₉ | 2000 | 21 | 2.36 | 32.3 | 34.6 | 82.9 | 69.2 | 0.5 | 5.8 | 36.1 | ◎ | X |
| Comparative example 6 | SrFe₁₂O₁₉ | 11000 | 43 | 1.81 | 48.9 | 34.6 | 80.1 | 64.6 | 0.9 | 9.1 | 22.9 | ○ | △ |
| Comparative example 7 | SrFe₁₂O₁₉ | 13000 | 22 | 1.86 | 46.6 | 34.5 | 75.4 | 62.1 | 1.3 | 10.2 | 37.2 | ◎ | X |

In the carrier core materials according to the present invention in examples 1 to 9, the charged amount was kept high so as to be equal to or more than 21.5 μC/g, the apparent density was equal to or less than 2.24 g/cm³ such that a large number of air gaps were present between the particles and thus the amount of toner which was able to be supplied to the development region was large, with the result that satisfactory image densities were obtained.

When the apparent density was equal to or more than 1.89 g/cm³, only a small number of particles having excessive recesses and projections were provided, and thus the production of fine powder caused such as by cuts in the projections was reduced and since the magnetization $\sigma_{1k}$ was so high as to be equal to or more than 63.9 Am²/kg, the carrier scattering where the toner was adhered to the photosensitive drum was reduced.

By contrast, in the carrier core materials of comparative examples 1 to 4 in which SrCO₃ was used as the Sr component raw material, the amount of Sr eluted was so high as to be equal to or more than 62 ppm, the charged amount was so low as to be 20.0 μC/g and the image density was low. Although in the carrier core material of comparative example 5, the SrFe₁₂O₁₉ powder was used as the Sr component raw material, since the content thereof was low and the apparent density was high, stress is increased, and thus cracks and chips occurred, with the result that carrier scattering occurred. In the carrier core material of comparative example 6, a large amount of hydrochloric acid was added such that the formation of recesses and projections in the surface of the particles was excessive, the apparent density was so low as to be 1.81 g/cm³ and fine powder caused such as by cuts in the projections was produced, with the result that the carrier scattering occurred. In the carrier core material of comparative example 7, a large amount of SrFe₁₂O₁₉ powder was mixed such that the formation of recesses and projections in the surface of the particles was excessive, fine powder caused such as by cuts in the projections was produced and the magnetization $\sigma_{1k}$ was so low as to be 62.1 Am²/kg, with the result that the carrier scattering occurred.

REFERENCE SIGNS LIST 3 development roller
5 photosensitive drum

The invention claimed is:

1. A carrier core material which is represented by a composition formula $M_xFe_{3-x}O_4$, wherein M is Mn and 0<X<1, in which part of M and/or Fe is substituted with Sr and which is formed of ferrite particles,
   wherein a Sr content is equal to or more than 2500 ppm but equal to or less than 12000 ppm,
   an amount of Sr eluted with pure water at a temperature of 25° C. is equal to or less than 50 ppm,
   an apparent density is equal to or more than 1.85 g/cm³ but equal to or less than 2.25 g/cm³ and
   magnetization $\sigma_{1k}$ when a magnetic field of 79.58×10³ A/m (1000 oersteds) is applied is equal to or more than 63 Am²/kg but equal to or less than 75 Am²/kg.

2. The carrier core material according to claim 1, wherein the carrier core material contains a compound represented by SrFe₁₂O₁₉.

3. An electrophotographic development carrier, wherein a surface of the carrier core material according to claim 1 is coated with a resin.

4. An electrophotographic developer comprising:
   the electrophotographic development carrier according to claim 3; and
   a toner.

5. The carrier core material according to claim 1, wherein 0.5<X<1.

* * * * *